United States Patent
Buxton et al.

(10) Patent No.: US 10,304,088 B2
(45) Date of Patent: May 28, 2019

(54) ADVERTISING FOR A USER DEVICE IN A STANDBY MODE

(71) Applicant: AT&T INTELLECTUAL PROPERTY I, L.P., Atlanta, GA (US)

(72) Inventors: Jason Buxton, Smithville, MO (US); Benjamin Hillman, Olathe, KS (US); Brian Wilson, Johnston, IA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 314 days.

(21) Appl. No.: 14/561,517

(22) Filed: Dec. 5, 2014

(65) Prior Publication Data

US 2016/0162948 A1 Jun. 9, 2016

(51) Int. Cl.
*G06Q 30/00* (2012.01)
*G06Q 30/02* (2012.01)

(52) U.S. Cl.
CPC ..... *G06Q 30/0262* (2013.01); *G06Q 30/0267* (2013.01)

(58) Field of Classification Search
CPC .............. G06Q 30/0262; G06Q 30/0267
USPC ............................ 705/14.59, 14.49
See application file for complete search history.

(56) References Cited

U.S. PATENT DOCUMENTS

| 6,011,537 | A | 1/2000 | Slotznick |
| 6,084,583 | A | 7/2000 | Gerszberg et al. |
| 7,278,093 | B2 | 10/2007 | Jablonski et al. |
| 7,360,230 | B1 | 4/2008 | Paz et al. |
| 7,401,348 | B2 | 7/2008 | Fries |
| 8,156,003 | B2 | 4/2012 | Saitou et al. |
| 8,401,710 | B2 | 3/2013 | Budhraja et al. |
| 2002/0002488 | A1 | 1/2002 | Muyres et al. |
| 2002/0052925 | A1 | 5/2002 | Kim et al. |
| 2002/0116269 | A1 | 8/2002 | Ishida |
| 2003/0004804 | A1 | 1/2003 | Landsman et al. |
| 2004/0049419 | A1 | 3/2004 | Knight |
| 2004/0162759 | A1 | 8/2004 | Willis |
| 2006/0015827 | A1 | 1/2006 | Ferguson et al. |

(Continued)

FOREIGN PATENT DOCUMENTS

| JP | 09325938 A | 12/1997 |
| JP | 10105144 A | 4/1998 |

(Continued)

OTHER PUBLICATIONS

•Chang, C. et al., "Mobile Advertising: Triple-win for Consumers, Advertisers and Telecom Carriers", SIGIR Workshop on Internet Advertising, Beijing, China, Jul. 28, 2011, 6 pages. Retrieved from IDS. (Year: 2011).*

(Continued)

*Primary Examiner* — James A Reagan
(74) *Attorney, Agent, or Firm* — Toler Law Group, PC (57) ABSTRACT

A method includes making, at a user device, a determination to transition to a standby mode. The method includes sending a message from the user device to a network device in response to the determination. The method includes receiving, in response to the message, an advertising stream at the user device from the network device. The method includes processing the advertising stream at the user device to generate advertising content. The method also includes sending the advertising content to a display device.

20 Claims, 4 Drawing Sheets

(56) References Cited

U.S. PATENT DOCUMENTS

| | | |
|---|---|---|
| 2008/0097836 A1 | 4/2008 | Silanto et al. |
| 2008/0134063 A1 | 6/2008 | Volach |
| 2008/0141297 A1 | 6/2008 | Dawson et al. |
| 2009/0216634 A1* | 8/2009 | Peltonen .............. G06Q 30/02 705/14.14 |
| 2010/0161398 A1 | 6/2010 | Albert et al. |
| 2011/0066501 A1 | 3/2011 | Saxena |
| 2011/0099444 A1* | 4/2011 | Tredoux ........... G11B 20/00115 714/746 |
| 2011/0307548 A1* | 12/2011 | Fisk ..................... H04L 29/06 709/203 |
| 2012/0022925 A1 | 1/2012 | Chen et al. |
| 2013/0268366 A1 | 10/2013 | Gordon et al. |
| 2013/0311293 A1 | 11/2013 | Ward et al. |
| 2014/0195352 A1 | 7/2014 | Govan et al. |
| 2015/0100463 A1* | 4/2015 | Drazin ................ G06Q 10/101 705/27.1 |

FOREIGN PATENT DOCUMENTS

| | | | | |
|---|---|---|---|---|
| JP | 2013105030 A | * | 5/2013 | ............ G09F 19/00 |
| KR | 20010011442 A | | 2/2001 | |
| WO | 0063791 A1 | | 10/2000 | |
| WO | 0073916 A1 | | 12/2000 | |
| WO | 2005078596 A1 | | 8/2005 | |

OTHER PUBLICATIONS

Cao, J., "Evaluation of Advertising Effectiveness Using Agent-Based Modeling and Simulation", Proceedings of 2nd UK Workshop of SIG on Multi-Agent Systems (UKMAS), Bristol, UK, Dec. 1999, 10 pages.

Chang, C. et al., "Mobile Advertising: Triple-win for Consumers, Advertisers and Telecom Carriers", SIGIR Workshop on Internet Advertising, Beijing, China, Jul. 28, 2011, 6 pages.

Gretzel, U. et al., "Preparing for the New Economy: Advertising Strategies and Change in Destination Marketing Organizations", Journal of Travel Research, vol. 39, Nov. 2000, Sage Publications, Inc., pp. 146-156.

Khasawneh, A. et al., "A Comprehensive Model of Factors Influencing Consumer Attitude Towards and Acceptance of SMS Advertising: an Empirical Investigation in Jordan", International Journal of Sales & Marketing Management, Research and Development, vol. 3, Issue 2, Jun. 2013, 22 pages.

Penev, A. et al., "Framework for Timely and Accurate Ads on Mobile Devices", Proceedings of the 18th ACM Conference on Information and Knowledge Management. ACM, New York, NY, 2009, pp. 1067-1076.

Yang, H., "The Effectiveness of Internet Advertisements", Comm. 509, Oct. 31, 2005, 10 pages.

* cited by examiner

ADVERTISING FOR A USER DEVICE IN A STANDBY MODE

FIELD OF THE DISCLOSURE

The present disclosure is generally related to providing advertising for a user device in a standby mode.

BACKGROUND

A user device may enter an idle state after passage of a period of time without receiving user input. When in the idle state, a display device coupled to the user device may be blank or may display content. The content may be text, a pattern, one or more images, a video, or combinations thereof, produced based on data retrieved from a memory of the user device. Alternately, the content may be content streamed to the user device via a network (e.g., photographic images from a photographic images web site).

DETAILED DESCRIPTION

An advertising stream provided by a service provider may be sent to a user device for display by a display device when the user device transitions from an active mode to a standby mode. Providing the advertising stream may be a revenue source for the service provider. For example, the service provider may charge fees to advertisers whose products, services, or messages are included in the advertising stream. The advertising stream may include targeted advertising, non-targeted advertising, local advertising for a geographic area where the user device is located, or combinations thereof. Providing the advertising stream may be event driven (e.g., when the user device transitions to a standby mode) and is not scheduled or dependent on available time slots. The advertising stream enables advertising to be associated with media content to which the service provider cannot add advertising. For example, the service provider may not be able to add advertising to premium channels provided as part of a television service package. The service provider may be able to provide advertising associated with a premium channel should the user device receiving the premium channel transition to a standby mode during receipt of content of the premium channel.

In an embodiment, a method includes making a determination, at a user device, to transition to a standby mode. The method includes sending a message from the user device to a network device in response to the determination. The method includes receiving, in response to the message, an advertising stream at the user device from the network device. The method also includes processing the advertising stream at the user device to generate advertising content and sending the advertising content from the user device to a display device coupled to or included in the user device.

In an embodiment, an apparatus includes a processor and a memory coupled to the processor. The memory includes instructions executable by the processor to perform operations. The operations include making a determination to transition to a standby mode, sending a message to a network device in response to the determination, receiving an advertising stream from the network device in response to the message, processing the advertising stream to generate advertising content, and sending the advertising content to a display device coupled to the processor.

In an embodiment, a computer-readable device includes instructions executable by a processor to perform operations. The operations include receiving a standby message from a user device and sending an advertising stream to the user device in response to the standby message.

Figure 1:
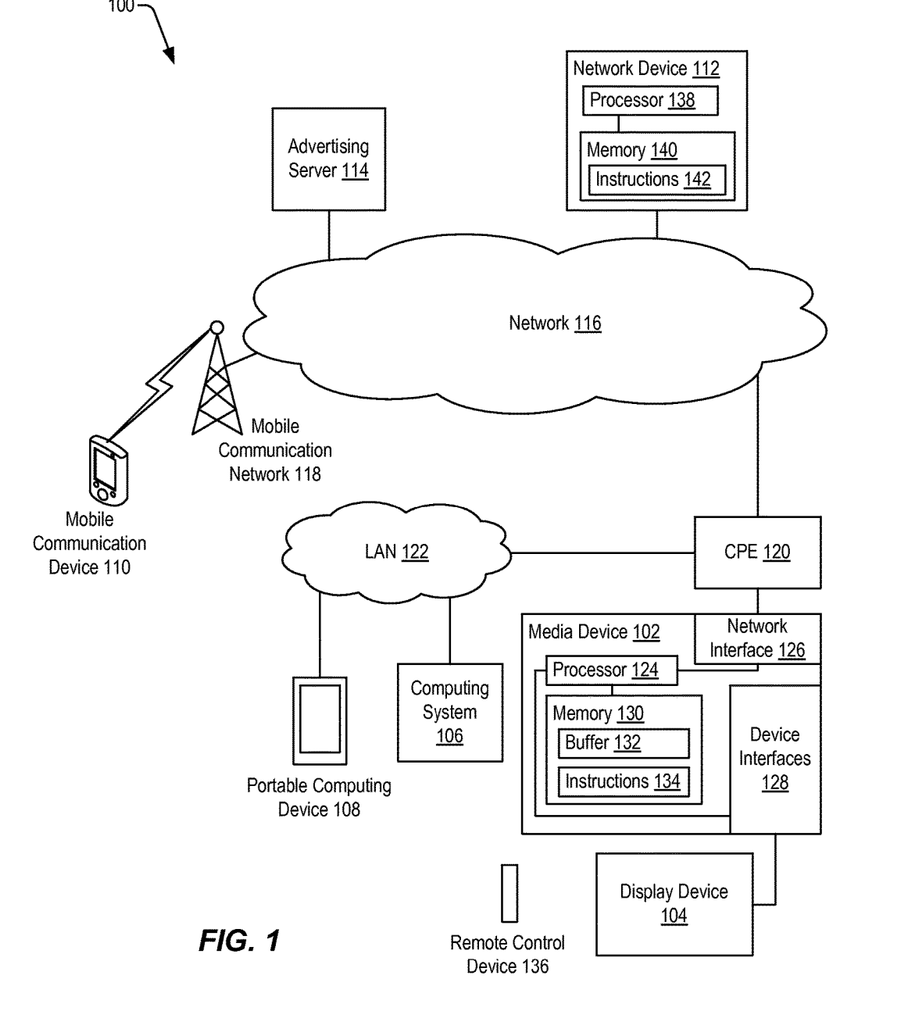
FIG. 1 is a block diagram of a particular embodiment of a system for providing advertising content via a network to a user device when the user device transitions to a standby mode.

FIG. 1 is a block diagram of a particular embodiment of a system 100 for providing an advertising stream to a user device (e.g., one or more of user devices 102-110) associated with a user when the user device is in a standby mode. The advertising stream may be sent to the user device in response to a message sent from the user device to a network device 112. An advertising server 114 may be a source of the advertising stream. The network device 112 may be associated with a service provider that provides telephone service, data service, television service, other services, or combinations thereof to the user devices 102-110. The network device 112 may be a server, a digital subscriber line multiplexer, a cable modem termination system, another type of network device, or combinations thereof.

The user devices 102-110 may be devices that are capable of communication with the network device 112 via a network 116 (e.g., the internet, a private network, or combinations thereof), a mobile communication network 118, or both. The user devices 102-110 may include, but are not limited to, one or more media devices 102 and one or more coupled output devices (e.g., one or more sound systems, one or more display devices 104, and combinations thereof), one or more computing systems 106, one or more portable computing devices 108 (e.g., one or more laptop computers, tablet computers, computerized glasses, personal digital assistants, etc.), one or more mobile communication devices 110 (e.g., a mobile phone), other devices, or combinations thereof. The number and type of user devices associated with a particular user may vary. The media device 102 may be a set-top box device, a game system, or another device able to send media content to output devices coupled to the media device 102 and able to communicate via the network 116. The media device 102 may be an integral component of a display device 104 or a separate component.

One or more of the user devices 102-110 may receive streaming media content from the network 116 via customer premises equipment (CPE) 120. The CPE 120 may facilitate communications between the network 116 and each media device 102 coupled to the CPE 120. The CPE 120 may also facilitate communications to and from the network 116 and one or more user devices (e.g., user devices 106-110) coupled by a wireless connection or a wired connection to a local area network (LAN) 122 established by, or accessible to, the CPE 120. The CPE 120 may be an access point to the network 116. The CPE 120 may include a router, a wireless router, a local area network device, a modem (e.g., a digital subscriber line modem or a cable modem), a residential gateway, another communication device, or combinations thereof.

A user device of the user devices 102-110 (e.g., the portable computing device 108 or the mobile communication device 110) may be able to receive the streaming media content via the mobile communication network 118 and the network 116. The user device may utilize the mobile communications network 118 when the user device is not in communication with the network 116 via the CPE 120 or another network access point.

Each of the user devices 102-110 may include a processor and a memory accessible to the processor. A particular processor may execute instructions stored in an associated memory to perform operations. The operations may include, but are not limited to, receiving a request for particular media content; sending the media content to a display device; and communicating with the network device 112, the advertising server 114, or both.

As an example, the media device 102 may include a processor 124. The processor 124 may be coupled to a network interface 126, device interfaces 128, and a memory 130. The network interface 126 may enable the media device 102 to communicate with other devices via the CPE 120. The other devices may include, but are not limited to, devices associated with the network 116 (e.g., the advertising server 114, the network device 112, one or more routers, digital subscriber line access multiplexers (DSLAMs), broadband remote access servers, a cable network video head end, etc.), and devices associated with the LAN 122 (e.g., the computing system 106 and the portable computing device 108).

The device interfaces 128 may enable wired or wireless connections of components and selected devices to the media device 102. The components may include, but are not limited to, the display device 104, a sound system, a camera system, a motion detector, another type of device, or combinations thereof.

The memory 130 may store data, such as settings and stored media content. The settings may include values for various options associated with the media device 102 (e.g., threshold values for times before the media device 102 transitions to a standby mode). Some or all of the values may be accessed and changed via one or more configuration interfaces. The memory 130 may include a buffer 132. The buffer 132 may provide temporary storage for processed media content that is to be sent to one or more output devices (e.g., the display device 104). The buffer 132 may be used to inhibit underflow of media content streamed to the media device 102 that would disrupt playback of the media content. The media content may be retrieved from the memory 130 of the media device 102 or may be retrieved or streamed from a content source via the LAN 122 or via the networks 116, 118. The memory 130 may also include instructions 134 executable by the processor 124. The instructions 134 may be executable by the processor 124 to receive a request for media content (e.g., a channel change request from a remote control device 136), process the media content to produce an output, and send the output to one or more output devices (e.g., the display device 104).

In a particular embodiment, a user device of the user devices 102-110 may determine to transition to a standby mode. In the description below, an exemplary embodiment is described in which the user device is the media device 102. In other embodiments, the user device may be the computing system 106, the portable computing device 108, the mobile communication device 110, or another device.

The media device 102 may determine to transition to the standby mode based on passage of a threshold amount of time without the media device 102 receiving user input, based on actuation of a switch of the media device 102, or both. For example, actuation of an on/off switch of the media device 102 when the media device 102 is in an active mode may cause the media device 102 to transition to the standby mode. The media device 102 may also transition to the standby mode after passage of a threshold amount of time when the media device 102 does not receive user input via the remote control device 136 associated with the media device 102 or another type of input device associated with the media device 102. A value of the threshold amount of time may depend on one or more activities that the media device 102 is performing. For example, the value of the threshold amount of time may be large (e.g., 2 hours, 3 hours, or another time value) when the media device 102 is sending media content corresponding to television programming to the display device 104. The value of the threshold amount of time may be smaller (e.g., 3 minutes, 5 minutes, or another time value) when the media device 102 is sending a menu, a web page, an information notice, or other content to the display device 104.

When the media device 102 determines to transition to the standby mode, the media device 102 may send a message to the network device 112. The message may be a message that satisfies a particular standard, such as a Society of Cable Telecommunication Engineers (SCTE) standard (i.e., a SCTE-30 message). The message may be a standby message. In some embodiments, the message may include a user profile or a portion of the user profile retrieved from the memory 130, a location associated with the media device 102, or both. The user profile may include data associated with the media device 102 that enables another device to determine targeted advertising for the media device. The data may include, but is not limited to, areas of interest of one or more users associated with the media device, prohibited advertising categories, history information of displayed programming associated with the media device 102, history information of visited web pages, purchase history associated with media device 102, other information, or combinations thereof. The location associated with the media device 102 may be used to provide local advertising associated with a geographic region that includes the media device 102.

The network device 112 may receive the message from the media device 102. The network device 112 may include a processor 138 and a memory 140 coupled to the processor 138. The memory 140 may include instructions 142 executable by the processor to perform operations. The operations may include receiving the message from the media device 102 and sending an advertising request to the advertising server for advertising content for the media device 102. The operations may also include sending an advertising stream received from the advertising server 114 in response to the advertising request to the media device 102. In alternate embodiments, the advertising server 114 may send the advertising stream to the media device 102 instead of forwarding the advertising stream to the media device 102 via the network device 112.

The media device 102 may receive the advertising stream in response to sending the message. The processor 124 may generate advertising content from the advertising stream and store the advertising content in the buffer 132. The processor 124 may send the advertising content from the buffer 132 through the device interfaces 128 to one or more output devices (e.g., the display device 104). The advertising content may be a banner, may be a video advertisement, may include audio, may be full screen on the display device 104, may occupy only a portion of the display device 104, may change positions on the display device 104, may have other display characteristics, or may include combinations thereof.

In an embodiment, the advertising stream may be interactive. For example, a user of the media device 102 may enter user input via the remote control device 136. In response, the media device 102 may display options, such as a first selectable option to interact with the advertising content and a second selectable option to exit the advertising content. When the user selects the first option, subsequent user input may enable the user to obtain information about products or services displayed by the advertising content or to purchase products or services displayed by the advertising content (e.g., the user may select a link displayed in the advertising content to access an e-commerce website of a particular advertiser). Also, a exit an interactive mode associated with the advertising stream.

When the advertising stream is not interactive and the media device 102 receives user input, or when the user selects the second option when the advertising stream is interactive, the media device 102 may transition to an active mode. In response to the user input, or selection of the second option, the media device 102 may send an active message to the network device 112. The active message may include identification information of a particular television channel that the media device 102 was receiving when the media device 102 transitioned to the standby mode, so the media device 102 can return to the particular television channel.

In response to the active message, the processor 138 of the network device 112 may execute instructions 142 stored in the memory 140 to stop sending the advertising stream to the media device 102. When the active message includes the identification information of the particular channel, the network device 112 may send content of the particular channel to the media device 102.

In some embodiments, the media device 102 may send a stop message to the network device 112 after passage of a period of time of receiving the advertising stream without receiving user input. Alternately, the network device 112 may stop sending the advertising stream to the media device 102 after passage of a particular period of time. Stopping the advertising stream may conserve network resources when a lack of user input implies that nobody is paying attention to the advertising content.

In some embodiments, a particular user device may determine whether the standby message is to be sent to the network device 112 depending on what the particular user device is doing (e.g., a mode of the user device) when an event (e.g., a time out) that indicates transition to the standby mode occurs. For example, the particular user device may be the mobile communication device 110. After passage of a threshold time without receiving user input at the mobile communication device 110 when the mobile communication device 110 is not receiving a media content stream via the mobile communication network 118 or the via the LAN 122, the mobile communication device 110 may blank the display device or activate a screen saver program. After passage of the threshold time without receiving user input at the mobile communication device 110 when the mobile communication device 110 is receiving a media content stream via the mobile communication network 118 or the via the LAN 122, the mobile communication device 110 may send the standby message to the network device 112. The network device 112 may respond to the standby message by sending the advertising stream to the mobile communication device 110.

Figure 2:
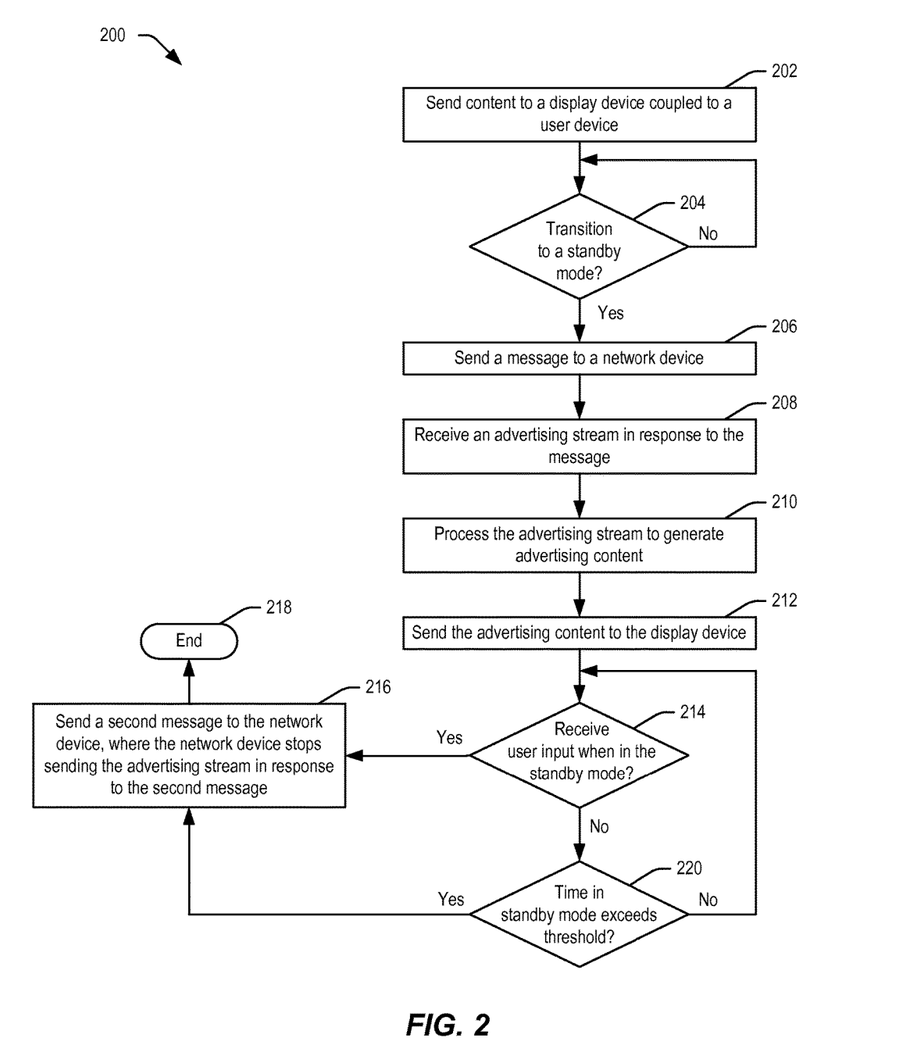
FIG. 2 is a flowchart of a first embodiment of a method to provide advertising content via a network to a user device when the user device transitions to a standby mode.

Referring to FIG. 2, a flowchart of a particular embodiment of a method 200 to provide advertising to a user device when the user device is in a standby mode is shown. The method may be performed by one or more of the media devices 102-110 of FIG. 1.

The method 200 includes sending content to a display device coupled to the user device, at 202. The content may be media content retrieved from memory associated with the user device (i.e., media content recorded by the user device or media content downloaded to the user device), an information screen or menu generated by the user device that presents one or more selectable options to a user, content received via a network from a network device (e.g., a web page), media content generated by the user device from a media content stream received via the network from the network device, an image from the media content stream or the media content when the media content stream or the media content is paused during playback, or combinations thereof. The media content stream may correspond to media-on-demand content, pay-per-view content, a television channel of a plurality of broadcast television channels currently being broadcast, or other media content streamed to the user device for playback. The display device may be an integral component of the user device, may be coupled to the user device by a physical data connection, or may by wirelessly coupled to the user device.

The user device may determine whether to transition to a standby mode, at 204. A determination to transition to the standby mode may be based on occurrence of an event. The event may be activation of a switch of the user device. For example, the user of the user device may actuate an on/off switch of the user device. The user device may transition to the standby mode when the on/off switch is actuated. The user device may remain powered when the on/off switch is actuated so that the user device can provide background functionality (e.g., record a scheduled program).

The event may be a temporal event. For example, the user device may send a menu to the display device when playback of media content is stopped, or after reaching an end of playback of the media content, to enable the user to select from one or more options what the user device should do next. The user device may perform operations associated with a particular option when the user device receives user input selecting the particular option. The user device makes a determination to transition to the standby mode after passage of a threshold time without receiving user input. The threshold time may be 1 minute, 2 minutes, 3 minutes, or a different time period.

As another example of a temporal event used to determine whether to transition to the standby mode, the user device may store a time value when most recent user input associated with media content to be sent, or being sent, to the display device was received via a remote control device. The most recent user input may be input that selected particular media content, volume control input, a record command, or another type of command that does not result in the user device ceasing to send the media content to the display device. The user device may compare a difference of a present time and the time value to a threshold time difference. A value of the threshold time difference may depend on a type of the media content. For example, if the media content corresponds to a broadcast television channel, the value of the threshold time difference may be large (e.g., 2.5 hours, 3 hours, 3.5 hours, or some other value) and if the media content corresponds to a webpage that is not streaming requested media content to the user device, the value of the threshold time difference may be small (e.g., 2, minutes, 5 minutes, 10 minutes, or some other value). When the difference satisfies the threshold time difference (e.g., is equal to or greater than the threshold time difference), the user device makes a determination to transition to the standby mode. When the difference does not satisfy the threshold time difference, the user device may remain in an active mode and continue to send the media content to the display device.

As a further example of a temporal event used to determine whether to transition to the standby mode, the user device may receive a pause command during receipt of a media content stream. When the media content stream corresponds to a television channel of a plurality television channels currently being broadcast or pay-per-view content, the user device may record the media content stream up to a predetermined amount of time (e.g., 1 hour, 2 hours, or another amount of time). While the media content stream is paused, the user device may compare the difference of the present time and the time value associated with the most recent user input to a first threshold time difference (e.g., 2 minutes, 3 minutes, 10 minutes, or some other time difference). When the difference satisfies the first threshold time difference (e.g., is equal to or greater than the first threshold time difference), the user device transitions to the standby mode. Should the predetermined time be reached without display of the media content being resumed or transmission of the media content stream ending, the user device may stop recording the media content stream and the user device may present via the display device a menu that displays options of what the user device should do next. For example, the menu may include an option to store recorded content that was recorded while the media content was paused and an option to delete the recorded content. The user device may perform operations associated with a particular option when the user device receives user input selecting the particular option. The user device makes a determination to transition to the standby mode when the user device does not receive user input after passage of a threshold time (e.g., 1 minute, 2 minutes, 3 minutes, or a different time period) while the menu is displayed.

When the user device determines that it is not to transition to the standby mode, at 204, the method 200 may return to 204 and determine again whether to transition to the standby mode. When the user device determines to transition to the standby mode, at 204, the user device may send a message to the network device, at 206. The message may be a standby message. The message may include data that facilitates the network device providing targeted advertising to the user device. The data may identify the user device or a user associated with the user device. The network device may use the data to retrieve a user profile that includes information (e.g., areas of interest, previous purchase history, frequently visited websites, etc.) usable to provide targeted advertising to the user device. Alternately, the data may include a user profile or user profile information associated with targeted advertising.

In some embodiments, the user device may make an additional determination after determining to transition to the standby mode, at 204. The user device may determine whether to send the message to the network device based on current activity or lack of current activity. For example, when the user device is computing system 106, the portable computing device 108, or the mobile communication device 110 of FIG. 1, the user device may send the message to the network device when the user device determines that the user device is receiving a media content stream that is being processed and sent to the display device. The user device may not send the message to the network device when the user device determines that the user device is not receiving a media content stream that is being processed and sent to the display device. Instead, the user device may cause the display device to display a blank screen or the user device may activate a screen saver program to send screen saver content to the display device.

In response to the message, the user device may receive an advertising stream, at 208. The advertising stream may be received from the network device or may be sent to the user device from the advertising server. The user device may process the advertising stream to produce advertising content, at 210. The user device may send the advertising content to the display device, at 212. The user device is in the standby mode when the user device sends the advertising content to the display device.

The user device may determine when user input is received while the user device is in the standby mode, at 214. When user input is received, the user device may transition from the standby mode to the active mode and the user device may send a second message to the network device, at 216. The network device stops sending the advertising stream to the user device in response to the second message.

When the user device was receiving a media content stream corresponding to a particular television channel immediately preceding the transition to the standby mode, the second message may include information that identifies the media content stream (or the particular television channel). The user device may receive the media content stream (or other content of the particular television channel) from the network device in response to the second message. The user device may process the media content stream to provide content and may send the content to the display device. When the user device was not receiving the media content stream, the media device may send a menu that presents selectable options for what the user device is to do next, and the method 200 may end, at 218.

When user input was not received, at 214, the user device may determine whether a time in the standby mode exceeds a standby threshold, at 220. The standby threshold may be 3 minutes, 5 minutes, 10 minutes, 30 minutes, an hour, or another time value. When the time in the standby mode does not exceed the standby threshold, at 220, the method 200 may return to 214 and determine again whether user input was received when the user device is in the standby mode.

When the time in the standby mode does exceed the standby threshold, at 220, the user device may send a second message to the network device, at 216. The network device may stop sending the advertising stream in response to the second message. The user device may send nothing to the display device (e.g., a blank screen) or the user device may send an image to the display device (e.g., a moving logo or screensaver image). The user device may transition to an active mode when the media device receives user input (e.g., actuation of the on/off switch or user input). The method 200 may end at 218

Figure 3:
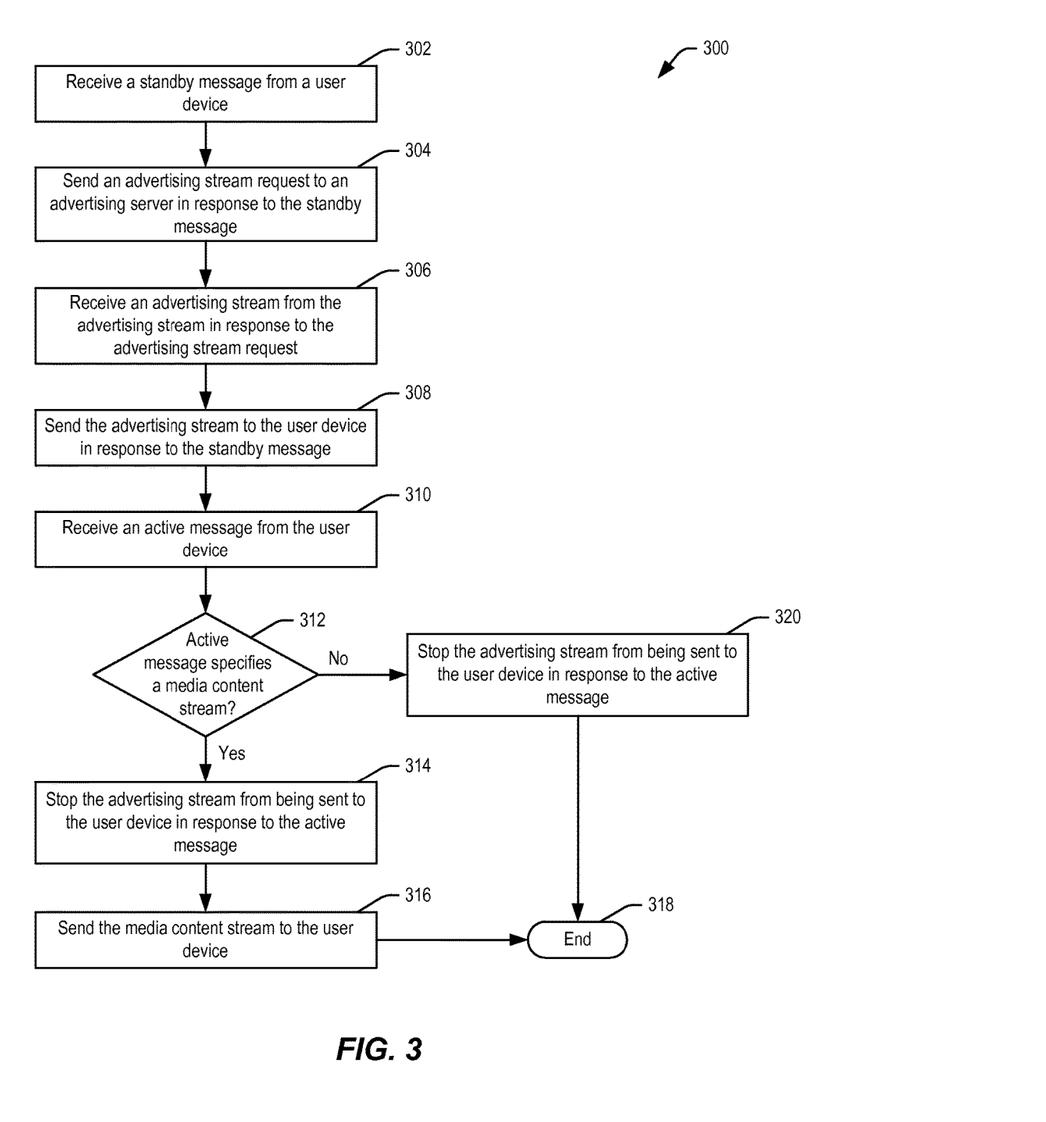
FIG. 3 is a flowchart of a second embodiment of a method to provide advertising content via a network to a user device when the user device transitions to a standby mode.

Referring to FIG. 3, a flowchart of a second particular embodiment of a method 300 to provide advertising to a user device when the user device is in a standby mode is shown. The method may be performed by the network device 112 of FIG. 1.

The method 300 includes receiving a standby message at the network device from a user device, at 302. The standby message may be received from the user device when the user device transitions from an active mode to a standby mode. The standby message may include identification of the user device, all or a portion of a user profile, location data associated with the media device, other content, or combinations thereof. The network device may send an advertising stream request to an advertising server in response to the standby message, at 304.

The advertising stream request may include user profile information that enables targeted advertising, a location associated with the user device that enables local advertising, or both. The user profile information may include user profile information received with the standby message, a user profile or information from the user profile retrieved by the network device based on user identification information from the standby message, information that enables the advertising server to retrieve the user profile, or combinations thereof. The location may be data provided in the standby message, may be data retrieved by the network device, may be data describing a location of the network device when the network device is located near the network device, or may be combinations thereof.

The network device may receive an advertising stream from the advertising server in response to the advertising stream request, at 306. The advertising stream may include targeted advertising, non-targeted advertising, local advertising associated with a geographical region that includes the user device, or combinations thereof. The network device may send the advertising stream to the user device in response to the standby message, at 308.

In an embodiment, the network device may monitor an amount of time that the advertising stream is sent to the user device. When the amount of time meets or exceeds a threshold time (e.g., 15 minutes, 30 minutes, an hour, or some other time), the network device may stop sending the advertising stream to the user device. Alternately, the network device may receive a stop message from the user device after passage of a particular amount of time. In response to the stop message, the network device may cease sending the advertising stream to the user device. Stopping the advertising stream after a period of time after the passage of the particular amount of time or in response to the stop message may limit system bandwidth usage.

The network device may receive an active message from the user device, at 310. The active message may indicate that the user device received user input while the user device was in the standby mode. The network device may determine whether the active message specifies a media content stream, at 312. When the active message specifies the media content stream at 312, the network device may stop the advertising stream from being sent to the user device, at 314. The network device may stop the advertising stream by sending a stop message to the advertising server and by ceasing to send the advertising stream to the user device. The network device may also send the media stream to the user device, at 316, and the method 300 may end at 318.

When the active message does not specify the media content stream at 312, the network device may stop the advertising stream from being sent to the user device, at 320. The method 300 may end at 318.

Various embodiments disclosed herein describe providing an advertising stream to a user device for display by a display device after the user device transitions from an active mode to a standby mode. The advertising stream may be provided by a service provider that provides communication services, data services, television services, or other services to the user device. Providing the advertising stream may be a revenue source for the service provider. The advertising stream may be provided to the user device when an event occur, and therefore, the advertisements are not scheduled or dependent on available predetermined time slots. The advertising stream may include targeted advertising, non-targeted advertising, local advertising for a geographic area where the user device is located, or combinations thereof.

Figure 4:
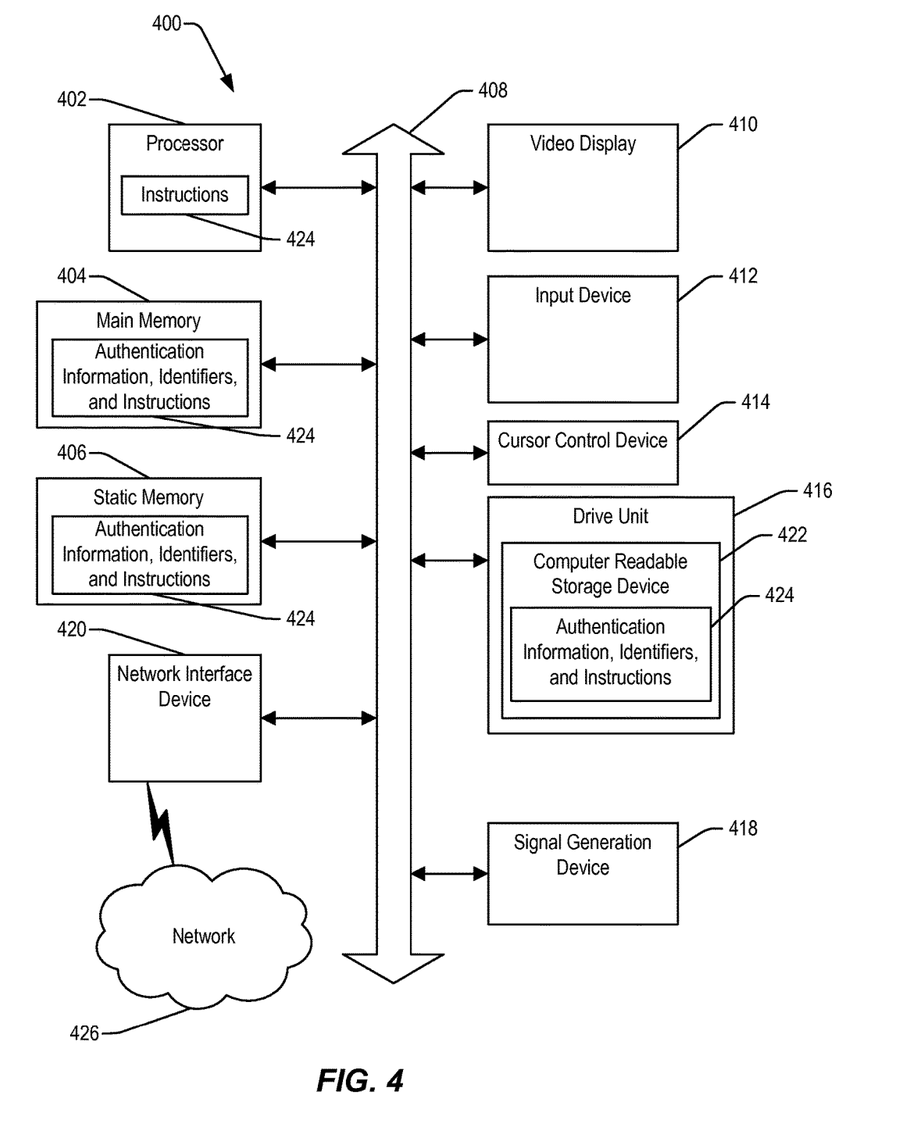
FIG. 4 is a block diagram of an illustrative embodiment of a general computer system.

Referring to FIG. 4, an illustrative embodiment of a general computer system is shown and is designated 400. The computer system 400 includes a set of instructions (e.g., the instructions 424 in the memory 404) that can be executed to cause the computer system 400 to perform any one or more of the methods or computer based functions disclosed herein. The computer system 400 may operate as a stand-alone device or may be connected (e.g., using a network) to other computer systems or peripheral devices. For example, the computer system 400 may include or may be included within any one or more of the media device 102, the display device 104, the computing system 106, the portable computing device 108, the mobile communication device 110, the network device 112, the advertising server 114, or combinations thereof described with reference to FIG. 1.

In a networked deployment, the computer system 400 may operate in the capacity of a server or as a client user computer in a server-client user network environment, or as a peer computer system in a peer-to-peer (or distributed) network environment. The computer system 400 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), a set-top box (STB) device, a customer premises equipment device, an endpoint device, a web appliance, or any other machine capable of executing a set of instructions (sequential or otherwise) that specify actions to be taken by that machine. In a particular embodiment, the computer system 400 may be implemented using electronic devices that provide video, audio, data communication, or combinations thereof. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402 (e.g., a central processing unit (CPU), a graphics processing unit (GPU), or both). For example, the processor 402 may include or correspond to the processor 124 of the media device 102 or the processor 138 of the network device 112 of FIG. 1. Moreover, the computer system 400 may include a main memory 404 and a static memory 406, which can communicate with each other via a bus 408. For example, the main memory 404 may include or correspond to the memory 130 of the media device 102 or the memory 140 of the network device 112 of FIG. 1. As shown, the computer system 400 may further include a video display unit 410, such as a liquid crystal display (LCD), a light emitting diode (LED) display, a touch screen display, a flat panel display, a solid state display, or a lamp assembly of a projection system. Additionally, the computer system 400 may include an input device 412, such as a remote control device (e.g., a television remote or a set-top box remote), a keyboard, a joystick, another type of input device, or combinations thereof. In addition, the computer system 400 may include a cursor control device 414 (e.g., a mouse). In some embodiments, the input device 412 and the cursor control device 414 may be integrated into a single device, such as a capacitive touch screen input device. The computer system 400 may also include a drive unit 416, a signal generation device 418, such as a speaker or remote control, and a network interface device 420. Some computer systems 400 may not include an input device (e.g., a server may not include an input device).

In a particular embodiment, as depicted in FIG. 4, the drive unit 416 may include a computer-readable storage device 422 in which authentication information, identifiers, and one or more sets of instructions 424, e.g. software, can be embedded. The computer-readable storage device 422 may be random access memory (RAM), read-only memory (ROM), programmable read-only memory (PROM), erasable PROM (EPROM), electrically erasable PROM (EEPROM), one or more registers, solid-state memory, one or more hard disks, one or more removable disks, compact disc read-only memory (CD-ROM), other optical disk storage, magnetic disk storage, magnetic storage devices, or any other storage device usable to store program code in the form of instructions or data and that can be accessed by a computer and/or a processor. A computer-readable storage device is not a signal.

Further, the instructions 424 may embody one or more of the methods or logic as described herein. The instructions 424 may be executable by the processor 402 to perform one or more functions or methods described herein, such as the methods 200 or 300 described with reference to FIG. 2 or FIG. 3, respectively. In a particular embodiment, the authentication information, identifiers, and instructions 424 may reside completely, or at least partially, within the main memory 404, the static memory 406, and/or within the processor 402 during execution by the computer system 400. The main memory 404 and the processor 402 also may include a computer-readable storage device. The authentication information included in the authentication information, identifiers, and instructions 424 in the drive unit 416, the main memory 404, the static memory 406, the processor 402, or combinations thereof may be transmitted to another computer system to enable authentication of the computer system 400, and the identifiers may include a list of identifiers used to authenticate the other computer system, prior to sharing a resource with the other computer system.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality described herein. It is further noted that a computing device, such as a processor, a controller, a state machine or other suitable device for executing instructions to perform operations may perform such operations directly or indirectly by way of one or more intermediate devices directed by the computing device.

The computer system 400 may communicate with one or more external systems via a network 426. First data stored by the computer-readable storage device 422 may be sent to the one or more external systems via the network 426. Also, second data may be received by the computer system 400 via the network 426. The second data may be stored by the processor 424 to the computer-readable storage device. Additionally, while the computer-readable storage device 422 is shown to be a single device, the computer-readable storage device 422 may be a single device or may be multiple devices, such as a centralized or distributed database, and/or associated caches and servers that store one or more sets of instructions. The computer-readable storage device 422 is capable of storing a set of instructions for execution by the processor 402 to cause the computer system 400 to perform any one or more of the methods or operations disclosed herein.

In a particular non-limiting, exemplary embodiment, the computer-readable storage device 422 may include a solid-state memory such as embedded memory (or a memory card or other package that houses one or more non-volatile read-only memories). Further, the computer-readable storage device 422 may include a random access memory or other volatile re-writable memory. Additionally, the computer-readable storage device 422 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for short-range communications and long-range communications can be used by the computer system 400 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   making, at a user device, a determination to transition to a standby mode;
   sending a message from the user device to a network device in response to the determination;
   receiving, in response to the message, a content stream at the user device;
   processing the content stream at the user device to load a buffer of the user device with video content, the buffer configured to inhibit a disruption of the video content during a playback of the video content;
   sending the video content from the buffer to a display device while the user device is in the standby mode; and
   in response to a time in the standby mode exceeding a threshold, transmitting a second message to the network device from the user device, wherein, in response to the transmitting of the second message, the user device remains in the standby mode and receipt of the content stream ceases.

2. The method of claim 1, wherein the determination to transition to the standby mode is made in response to a passage of a threshold time without receiving a user input at the user device.

3. The method of claim 1, wherein the determination to transition to the standby mode is made in response to an actuation of a switch of the user device.

4. The method of claim 1, further comprising:
   sending content to the display device while making the determination, wherein the content comprises media content generated from a media content stream received from the network device, and wherein the media content stream corresponds to a television channel of a plurality of broadcast television channels;
   receiving a user input at the user device while the user device is in the standby mode;
   sending an activate message from the user device to the network device in response to the user input, wherein the activate message identifies the media content stream;
   receiving the media content stream from the network device instead of the content stream in response to the activate message; and
   sending the media content generated from the media content stream to the display device.

5. The method of claim 1, wherein the user device comprises a set-top box device, a computing device, a mobile communications device, or a combination thereof.

6. The method of claim 1, wherein the content stream corresponds to a banner advertisement displayable at the display device.

7. The method of claim 1, wherein the content stream includes advertising.

8. The method of claim 1, wherein the content stream includes targeted advertising associated with the user device, non-targeted advertising, or both.

9. An apparatus comprising:
   a processor; and
   a memory coupled to the processor, the memory comprising instructions executable by the processor to perform operations, the operations including:
     making a determination to transition to a standby mode;
     sending a standby message that indicates a start of the standby mode to a network device in response to the determination;
     receiving a content stream from the network device in response to the standby message;
     processing the content stream to load a buffer of the memory with video content, the buffer configured to inhibit a disruption of the video content during a playback of the video content; and
     sending the video content from the buffer to a display device coupled to the processor while the processor is in the standby mode.

10. The apparatus of claim 9, wherein the operations further include sending a menu to the display device, and wherein the determination to transition to the standby mode is made in response to a passage of a threshold time without receiving a user input when the menu is sent to the display device.

11. The apparatus of claim 10, wherein the menu is sent to the display device after reaching an end of a playback of a media-on-demand content item.

12. The apparatus of claim 9, wherein the operations further include:
   determining that a time in the standby mode satisfies a threshold; and
   sending a second message to the network device in response to the time in the standby mode satisfying the threshold, wherein, in response to the second message, the network device stops sending the content stream and the processor stays in the standby mode.

13. The apparatus of claim 9, wherein the operations further include sending media content corresponding to a received media stream to the display device, and wherein the determination to transition to the standby mode is made in response to a passage of a threshold time without receiving a user input while the media content is sent to the display device.

14. The apparatus of claim 13, wherein the received media stream corresponds to a particular channel of a television service.

15. The apparatus of claim 9, wherein the making the determination to transition to the standby mode is based on a passage of a first threshold time without receipt of a user input, wherein the first threshold time is a first value responsive to the processor causing media content received as streaming media to be sent to the display device, wherein the first threshold time is a second value responsive to the processor causing content not received as streaming media to be sent to the display device, and wherein the first value is greater than the second value.

16. A computer-readable storage device comprising instructions executable by a processor to perform operations, the operations including:
   receiving a standby message from a media device receiving a media content stream, wherein the standby message indicates that the media device is to enter a standby mode; and
   sending a content stream to the media device in response to the standby message, wherein the media device is configured to send media content of the content stream to a display device while the media device is in the standby mode.

17. The computer-readable storage device of claim 16, wherein the operations further include:
   sending a content stream request to an advertising server; and
   receiving the content stream from the advertising server in response to the content stream request.

18. The computer-readable storage device of claim 17, wherein the content stream request includes user profile information that enables targeted advertising, a location associated with the media device that enables local advertising, or both, wherein the user profile information includes user profile information received with the standby message, a user profile or information from the user profile retrieved based on user identification information from the standby message, information that enables the advertising server to retrieve the user profile, or combinations thereof, and wherein the content stream includes targeted advertising, non-targeted advertising, local advertising associated with a geographical region that includes the media device, or combinations thereof.

19. The computer-readable storage device of claim 16, wherein the operations further include:
   receiving an active message from the media device; and
   stopping the content stream from being sent to the media device.

20. The computer-readable storage device of claim 19, wherein the active message identifies a particular media stream to send to the media device and further comprising sending the particular media stream to the media device.

* * * * *